United States Patent
Alkhardawi

(10) Patent No.: US 11,394,203 B2
(45) Date of Patent: Jul. 19, 2022

(54) SYSTEM AND METHOD FOR CONTROLLING ELECTRICAL POWER DISTRIBUTION

(71) Applicant: SAUDI ARABIAN OIL COMPANY, Dhahran (SA)

(72) Inventor: Wasseem Ali Alkhardawi, Tanajib (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 16/997,425

(22) Filed: Aug. 19, 2020

(65) Prior Publication Data

US 2022/0060021 A1    Feb. 24, 2022

(51) Int. Cl.
*H02J 3/22*    (2006.01)
*H02J 3/18*    (2006.01)
*H02J 3/38*    (2006.01)

(52) U.S. Cl.
CPC .............. *H02J 3/22* (2013.01); *H02J 3/1821* (2013.01); *H02J 3/381* (2013.01)

(58) Field of Classification Search
CPC ............ H02J 3/1821; H02J 3/22; H02J 3/381
USPC .......................................................... 307/11
See application file for complete search history.

(56) References Cited

U.S. PATENT DOCUMENTS

| | | |
|---|---|---|
| 2015/0008766 A1 | 1/2015 | Boe et al. |
| 2015/0108952 A1* | 4/2015 | Moeller .................... G05F 3/04 |
| | | 323/205 |

FOREIGN PATENT DOCUMENTS

| | | |
|---|---|---|
| CN | 103078329 B | 8/2014 |
| CN | 106099891 A | 11/2016 |
| CN | 108879769 A | 11/2018 |
| CN | 110138002 A | 8/2019 |
| EP | 3220503 B1 | 11/2019 |
| RU | 1814141 C | 5/1993 |
| RU | 2318280 C2 | 2/2008 |

(Continued)

OTHER PUBLICATIONS

International Search Report and Written Opinion of the International Searching Authority issued in corresponding International Application No. PCT/US2020/049847, dated May 11, 2021 (83 pages).

(Continued)

*Primary Examiner* — Hal Kaplan
(74) *Attorney, Agent, or Firm* — Osha Bergman Watanabe & Burton LLP

(57) ABSTRACT

A distribution system may include at least one Power Management System (PMS) that controls electrical power distributed transmitted by the distribution system. The system may include a first power station located at an onshore platform. The first power station may include an onshore terminal that distributes electric power to the first power station and to at least one onshore load. The first power station may include various onshore reactors that monitor inbound reactive power received from the onshore terminal or that monitor outbound reactive power sent to a remote location. The system may include a second power station located at an offshore platform which is located at the remote location. The second power station may include an offshore terminal that receives electric power from the first power station and that delivers electric power to at least one offshore load.

19 Claims, 6 Drawing Sheets

(56) References Cited

FOREIGN PATENT DOCUMENTS

WO     2013087700 A1    6/2013
WO     2016017146 A1    2/2016

OTHER PUBLICATIONS

Marten, Anne-Katrin et al., "Kriegers Flak-Combined Grid Solution: Coordinated Cross-Border Control of a Meshed HVAC/HVDC Offshore Wind Power Grid", IET Renewable Power Generation, The Institution of Engineering and Technology, Michael Faraday House, Six Hills Way, Stevenage, Herts, SG1 2AY, UK, vol. 12, Issue 13, pp. 1493-1499, Mar. 23, 2018 (7 pages).

De Alegría, Iñigo Martínez et al., "Transmission Alternatives for Offshore Electrical Power", Renewable and Sustainable Energy Reviews, Elseviers Science, New York, NY, US, vol. 12, Issue 5, pp. 1027-1038, Jun. 2009 (12 pages).

Voight, Richard William, "Submarine High Voltage Power Transmission: Challenges and Opportunities", OTC-24448-MS, Offshore Technology Conference, Oct. 2013 (12 pages).

* cited by examiner

SYSTEM AND METHOD FOR CONTROLLING ELECTRICAL POWER DISTRIBUTION

BACKGROUND

Distributing electrical power requires configuring complex structures to respond to system disturbances to avoid blackouts. A robust electrical power distribution system ensures continuity of ongoing processes where electrical power is required. For electrical power distribution systems delivering electrical power to remote locations, power distribution structures are required to deliver robust, secure, and reliable power over large distances. In this regard, infrastructure relating to the power distribution structures must be fitted to sustain harsh environmental conditions over a long period of time. Power distribution structures at remote locations are usually located on desert areas, subterranean spaces, or submarine spaces where replacements are not preferred over long periods of time. Current power distribution schemes for delivering electrical power over long distances include power stations configured to regulate Direct Current (DC) or Alternative Current (AC). DC and AC distribution schemes usually require transformers along the distance to the remote location to maintain a desired voltage. In environments involving deserts, jungles, or oceans along the distance, maintaining a robust distribution of power requires a large financial investment as a result.

SUMMARY

In general, in one aspect, embodiments disclosed herein relate to a distribution system. The system includes at least one Power Management System (PMS) that controls electrical power transmitted by the distribution system. The system includes a first power station located at an onshore platform. The first power station includes an onshore terminal that distributes electric power to the first power station and to at least one onshore load. The first power station includes various onshore reactors that monitor inbound reactive power received from the onshore terminal or that monitor outbound reactive power sent to a remote location. The system includes a second power station located at an offshore platform which is located at the remote location. The second power station includes an offshore terminal that receives electric power from the first power station and that delivers electric power to at least one offshore load. The second power station includes various of offshore reactors that monitor inbound reactive power received from the first power station. The system includes at least one submarine cable connected between the first power station and the second power station. The at least one PMS monitors compensation reactive power in the various onshore reactors and the various offshore reactors.

In general, in one aspect, embodiments disclosed herein relate to method for distributing electrical power to a remote location from an onshore platform. The method includes configuring at least one Power Management System (PMS) to control electrical power transmitted between a first power station and a second power station. The method includes installing the first power station located at an onshore terminal. The method includes distributing electric power to the first power station and to at least one onshore load. The method includes monitoring, by the at least one PMS, inbound reactive power received from the onshore terminal to the first power station or outbound reactive power sent from the first power station to one or more remote locations. The method includes installing the second power station at an offshore platform, the offshore platform being located at a remote location. The method includes connecting at least one submarine cable between the first power station and the second power station. The method includes receiving electric power from the first power station at the second power station through the at least one submarine cable. The method includes delivering electric power from the second power station to at least one offshore load. The method includes monitoring, by the at least one PMS, inbound reactive power received from the first power station to the second power station.

In general, in one aspect, embodiments disclosed herein relate to a non-transitory computer readable medium storing instructions executable by a computer processor. The instructions include functionality for configuring at least one Power Management System (PMS) to control electrical power transmitted between a first power station and a second power station. The instructions include functionality for distributing electric power to a first power station and to at least one onshore load located at an onshore platform. The instructions include functionality for monitoring, by the at least one PMS, inbound reactive power received from an onshore terminal to the first power station or outbound reactive power sent from the first power station to one or more remote locations. The instructions include functionality for monitoring, by the at least one PMS, electric power received from the first power station at a second power station through at least one submarine cable that connects the first power station and the second power station. The instructions include functionality for distributing electric power from the second power station to at least one offshore load. he instructions include functionality for monitoring, by the at least one PMS, inbound reactive power received from the first power station to the second power station.

Other aspects of the disclosure will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
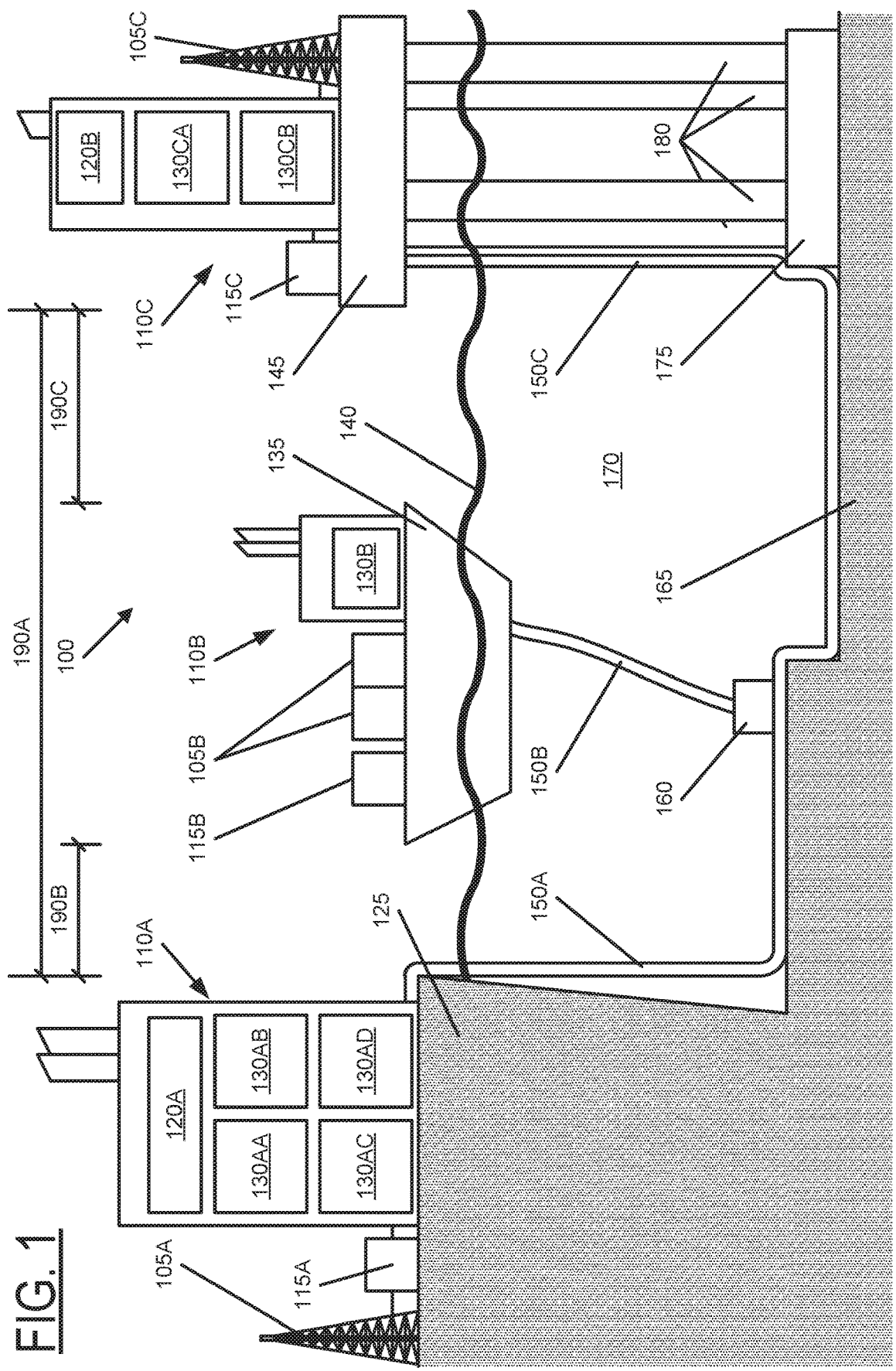
FIG. 1 shows a schematic diagram of a power distribution system in accordance with one or more embodiments.

Specific embodiments of the disclosure will now be described in detail with reference to the accompanying figures. Like elements in the various figures are denoted by like reference numerals for consistency.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include a system and a method for controlling electrical power (also referred to as power) distribution. In some embodiments, electrical power distribution is controlled over long distances or at power stations (i.e., substations) located at various remote locations. In some embodiments, power distribution schemes including Alternative Current (AC) are used over long distances. In this regard, some embodiments include compensation devices such as variable reactors located at each end of a long distance to completely compensate for the line capacitance along the way, while maintaining high voltage between any two power stations connected with long connection cables within acceptable limits.

In one or more embodiments, a Power Management System (PMS) is used to maintain robustness of the connection between any two power stations connected using cables alone (i.e., without requiring transformers installed along the distance). In some embodiments, the PMS controls a compensating voltage of the variable reactors to meet any reactive power requirements resulting from running cables over long distances. The PMS may be located on either end of the long distance. In one or more embodiments, the PMS is located at both ends of the long distance such that two PMSs may be configured for controlling power distribution in an entire power distribution system. In some embodiments, one PMS may be a primary PMS used for controlling the entire power distribution system, while an additional PMS may be a secondary PMS used as a hot standby for the primary PMS when, for example, the primary PMS is disconnected for maintenance. Further, in the event of a system disturbance, either PMS may assume control of the entirety of the distributed electrical power system.

FIG. 1 shows a schematic diagram illustrating a power distribution system 100 including power stations 110A, 110B and 110C located at different locations separated over long distances 190A, 190B and 190C. The long distances 190A-190C, not drawn to scale, are shown to be over a large body of water 170 (e.g., an ocean, a sea, or a large lake) such that the power station 110A is shown located on an onshore platform 125, the power station 110B is shown located on a permanently moored platform 135, and the power station 110C is shown located on an offshore platform 145. In some embodiments, the power stations 110A-110C are connected to one another using at least one submarine cable 150A, 150B, or 150C laid on an underwater floor 165 (e.g., seabed) over the long distances 190A-190C.

In some embodiments, a first power station 110A is a combination of one or more substations or power plants at the onshore platform 125. The onshore platform 125 may be an onshore location such as a lot of land located on a large area of a continent or an island. The first power station 110A may include a first PMS 120A and at least four reactors 130AA-130AD connected to a first submarine cable 150A, an onshore terminal 115A, and an onshore load 105A. The first PMS 120A may be a primary PMS that controls and monitors the distribution of electric power in the power distribution system 100. In one or more embodiments, the reactors 130AA-130AD may be variable shunt reactors configured to adapt upon receiving immediate feedback or control instructions from the PMS (120A). The onshore terminal 115A may be a combination of substation equipment configured for receiving power from a power grid outside of the first power station 110A (not shown) and delivering processed power to other locations of the first power station 110A. The onshore load 105A may be hardware located on the onshore platform 125 which requires using processed power from the onshore terminal 115A. The onshore load 105A may be electric equipment used in oil and gas applications including a resistive load (e.g., a drilling rig).

In some embodiments, a second power station 110B is a combination of one or more substations or power plants at the permanently moored platform 135. The permanently moored platform 135 may be an offshore location that is configured to remain fixed in a geological location above water level 140 such as a boat or platform configured for withstanding large weight loads. The permanently moored platform 135 may be fixed in the geological location using an anchor 160 connected through mooring cables (not shown). The second power station 110B may include at least one reactor 130B connected to a second submarine cable 150B, boat terminal 115B, and one or more loads 105B. The reactor 130B may be a variable shunt reactor configured to adapt upon receiving immediate feedback or control instructions from a PMS (120A, 120B). The boat terminal 115B may be a combination of substation equipment configured for receiving power from the first power station 110A and delivering processed power to other locations of the second power station 110B. The various loads 105B may be hardware located on the permanently moored platform 135 which require using processed power from the boat terminal 115B. The one or more loads 105B may be electric equipment used in oil and gas applications including a resistive load (e.g., electronic pressure gauges for hydrocarbon tanks).

In some embodiments, a third power station 110C is a combination of one or more substations or power plants at the offshore platform 145. The offshore platform 145 may be an offshore location such as a main deck positioned above the water level 140 and fixed to a geological location for performing drilling operations. The offshore platform 145 may be fixed in the geological location using an anchor such as piles 175 connected through risers 180. The third power station 110C may include a second PMS 120B and at least two reactors 130CA and 130CB connected to a third submarine cable 150C, an offshore terminal 115C, and an offshore load 105C. The second PMS 120B may be a secondary PMS that controls and monitors the distribution of electric power in the power distribution system 100. The reactors 130CA and 130CB may be variable shunt reactors configured to adapt upon receiving immediate feedback or control instructions from a PMS (120A, 120B). The offshore terminal 115C may be a combination of substation equipment configured for receiving power from the first power station 110A and delivering processed power to other locations of the third power station 110C. The offshore load 105C may be hardware located on the offshore platform 145 which require using processed power from the offshore terminal 115C. The offshore load 105C may be electric equipment used in oil and gas applications including a resistive load (e.g., a drilling rig).

In some embodiments, the submarine cables 150A-150C may include one or more fiber optic cables, internet connection cables, and power cables. The submarine cables 150A-150C may extend over large distances 190A-190C. These distances may be between 70 kilometers (km) and 300 km, which may cause the submarine cables 150A-150C to generate large amounts of capacitance reactive power during high-voltage transmissions. The submarine cables 150A-150C may be graded for high-voltages such that each submarine cable may transport between 200 kilovolts (kV) to 350 kV. As such, because reactive power is directly proportional to voltage, the capacitance reactive power (negative reactive power) created from using long submarine cables 150A-150C may be greater than 300 mega volt amps (MVAR) per submarine cable. In one or more embodiments, the PMSs 120A or 120B control the variable shunt reactors 130AA-130CB to directly absorb any capacitance reactive power generated.

In some embodiments, the first distance 190A may be approximately 180 km transporting power using 230 kV submarine cables 150A and 150C, and generating around negative 400 MVAR. In this case, reactive voltage may be controlled constantly at both sides of the submarine cables 150A and 150C through variable shunt reactors 130AA-130AD, 130CA, and 130CB operating at positive 738 MVAR. The PMS used to control power distribution in power stations 110A and 110C, further controls the voltage at both sides of the submarine cables 150A and 150C by regulating the corresponding variable shunt reactors 130AA-130AD or 130CA and 130CB.

In some embodiments, the PMSs 120A and 120B may be two redundant PMS controllers to control all variable shunt reactors 130AA-130CB located at the onshore platform 125, the permanently moored platform 135, and the offshore platform 145. These PMSs 120A and 120B may be redundant and communicating constantly such that one PMS may fully control all six variable shunt reactors 130AA-130CB and another PMS may be a hot standby. In this regard, the PMSs may dynamically maintain electrical parameters (i.e., voltages and power factors) within acceptable limits in all loading scenarios for facilities located in the power distribution system 100. Advantageously, in some embodiments, dynamically maintaining electrical parameters eliminates plant shutdowns due to overvoltage caused by changing loading conditions. To this point, the PMSs 120A and 120B constitute a fully automated system for all the reactors while meeting requirement of all the loading scenarios. Redundant automated PMSs are faster to implement while requiring less personnel to operate and to maintain when compared to schemes using static synchronous compensators (STATCOMs), and static VAR compensators (SVCs).

Those skilled in the art will appreciate that FIG. 1 is an illustrative example of a distribution system in accordance with embodiments disclosed herein, and that components shown may be omitted, duplicated, or combined without departing from the scope herein. For example, while six (6) shunt reactors are shown in FIG. 1, there may be any number of suitable reactors associated with each power station in the distribution system. Further, for example, there may be only an onshore power station 110A and offshore power station 110C controlled by two redundant PMSs 120A and 120B, without a permanently moored power station 110B in between.

Figure 2:
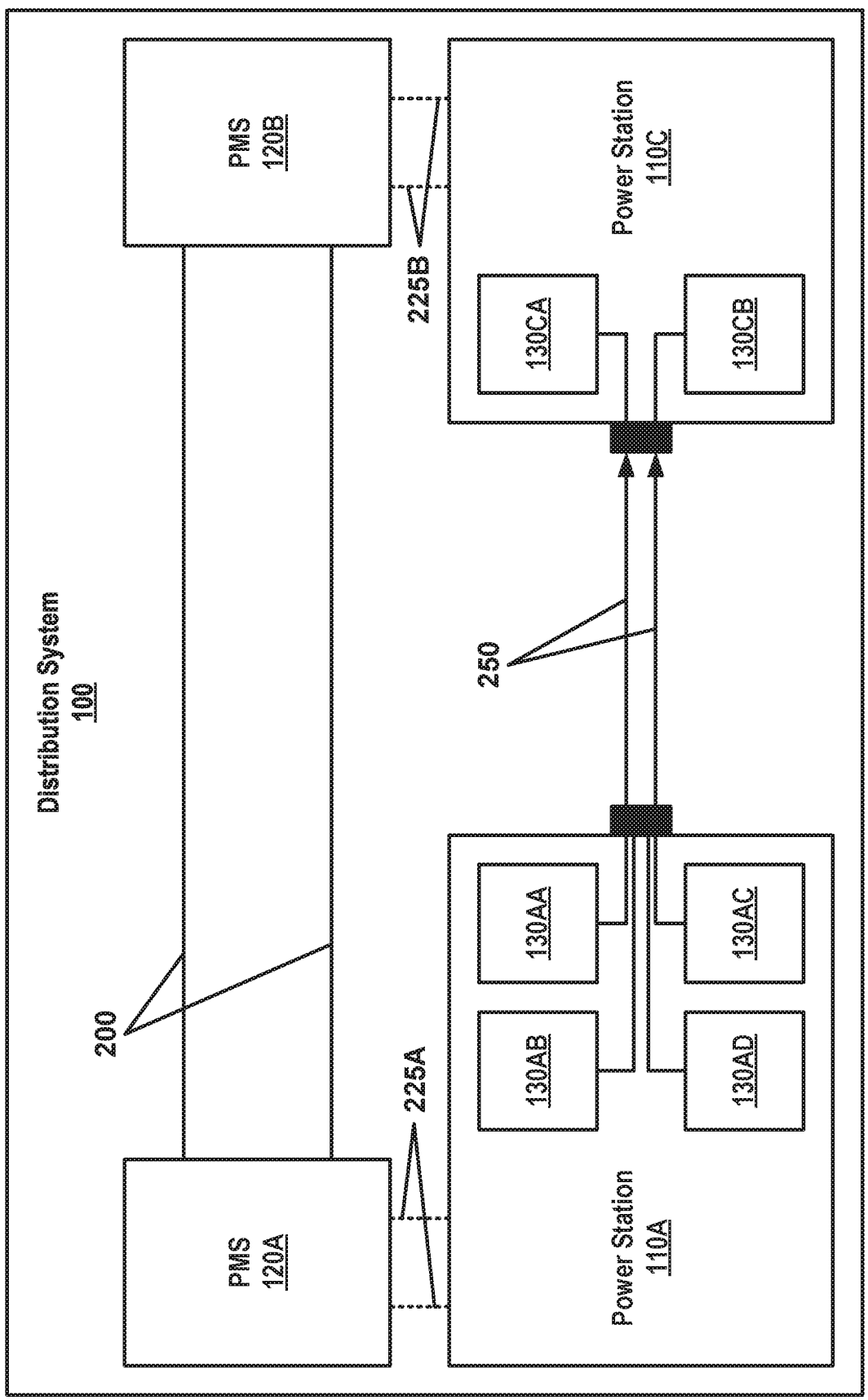
FIG. 2 shows a schematic diagram of a power distribution system in accordance with one or more embodiments.

FIG. 2 shows a schematic showing internal connections between electronic elements in the power distribution system 100. In some embodiments, the PMS 120A and the PMS 120B may be connected to one another through fiber optic cables 200 such that both PMSs may maintain a constant communication link. In some embodiments, both PMSs may maintain a same control outreach over the power being delivered in the entire power distribution system 100. In this regard, the PMSs 120A and 120B may have control links 225A and 225B for monitoring and modifying conditions in the power station 110A and the power station 110C. Specifically, either PMS may control any of the variable shunt reactors 130AA-130AD, 130CA, and 130CB through control lines 225A and 225B.

In some embodiments, using transmission cables 250, the power distribution system 100 may deliver electric power from the power station 110A to the power station 110C. In one or more embodiments, when one PMS that is operating as a primary PMS is taken offline, another PMS operating as a hot standby may take over management of the power distribution system 100 such that operations in the power distribution system 100 may continue without requiring any downtime of the power distribution system 100. In one or more embodiments, the optical fiber 200 and/or the transmission cables 250 may be disposed in one or more of the submarine cables 150A-150C described in reference to FIG. 1.

In one or more embodiments, controlling all reactors dynamically and automatically at both sides of the submarine cables 150A-150C through the PMS 120 may avoid any system overvoltage and ensure reliable power supply system in loading scenarios. Specifically, overvoltage risks may be mitigated by constantly monitoring the system and automatically adjusting the reactive compensation from the variable shunt reactors 130AA-130AD, 130CA, and 130CB using the PMSs 120A and 120B.

As shown in FIG. 2, embodiments disclosed herein provide a centralized mega volt amps (MVARs) controller acting as a PMS with two redundant power management controllers in both an onshore substation as well as an offshore substation. The PMS takes the input from the power system automation (PSA) and controls the tap changers of the multiple 230 kV shunt reactors at both power substations to regulate the voltage on both sides of the submarine cable as well as within the length/distance of the submarine cable.

Figure 3:
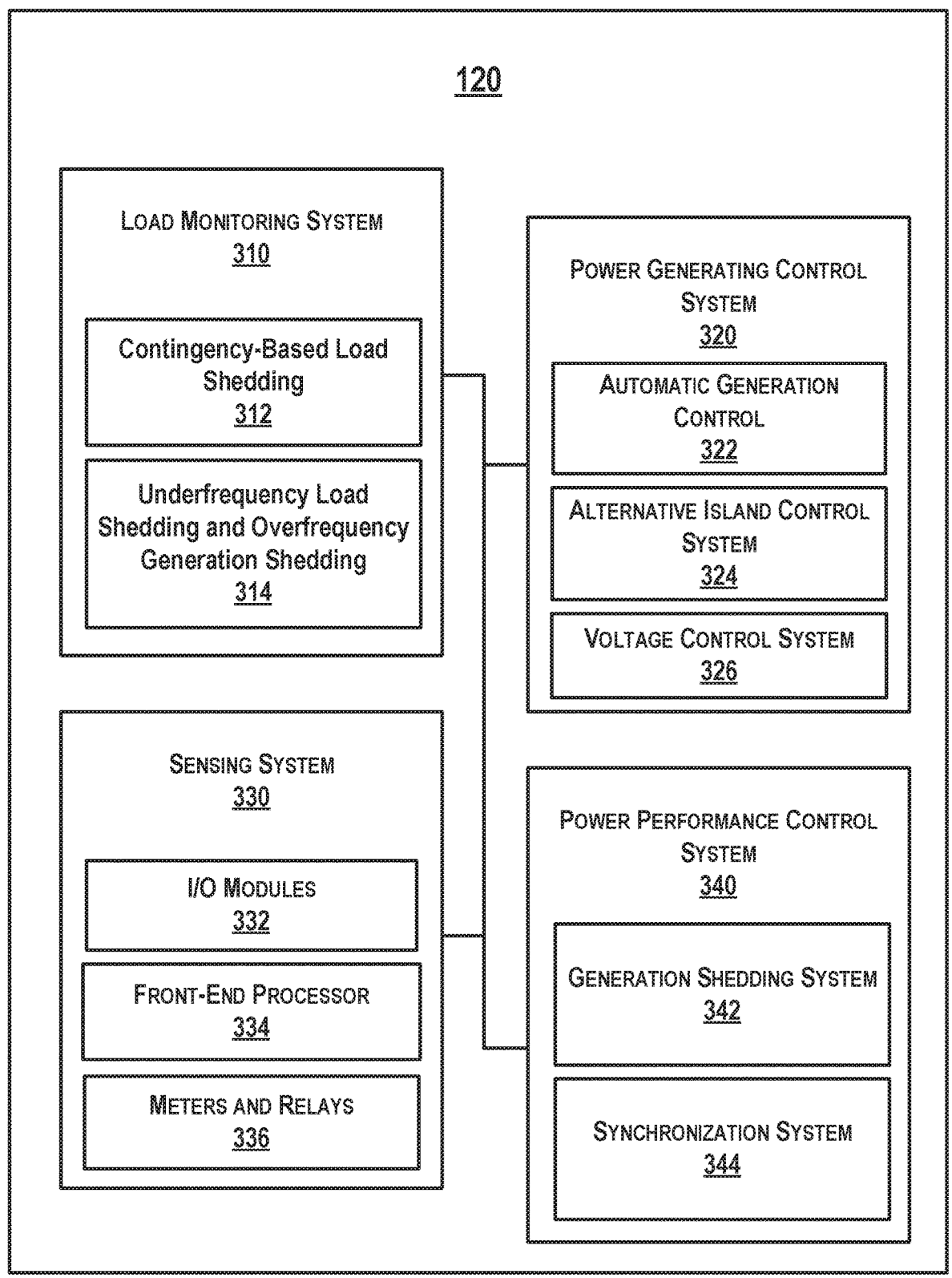
FIG. 3 shows a schematic diagram of a Power Management System (PMS) in accordance with one or more embodiments.

FIG. 3 shows a schematic diagram showing various subsystems constituting a PMS 120. In some embodiments, the PMS 120 includes electronic components that enable the PMS 120 to perform load monitoring functions, data collecting functions, and/or processing functions. In some embodiments, the electronic components may be configured to create communication links and control links with each element in the power distribution system 100. In some embodiments, the electronic components of the PMS 120 may be a combination of hardware and software including a load monitoring system 310, a control system 320, a sensing system 330, and a power distribution system 340. In some embodiments, these electronic components communicate with one another through wired or wireless connections for exchanging collected data and processed data. In this regard, connections including control communications may be implemented using wires or wireless protocols while connections including power transmissions may be implemented using wires rated for a specific voltage.

In some embodiments, the PMS 120 may be a utility energy management system performing remedial action schemes. The PMS 120 may combine low-speed functions, such as automatic generation control (AGC), Volt/VAR control systems (VCSs), and tie line control, with high-speed functions, such as load shedding and generation shedding. The PMS 120 may require auto-synchronization systems that synchronize generators with the power distribution system 100. The PMS 120 may ensure that robust operations are performed in the power distribution system 100 in a coherent fashion to control the power distribution system 100 during all manner of low-speed and high-speed disturbances or contingencies. A contingency may be any event that results in the loss of power to a grid section. Contingencies may occur when a tie line, bus coupler, sectionalizer, or generator breaker opens under load. A contingency may also be the overload of a transformer, cable section, or generator.

In some embodiments, the PMS 120 may be complete integrated in the power distribution system 100 for protection, control and automation of the power stations 110A-110C. These functions may require devices such as protective relays, embedded computers, logic controllers, I/O modules, and communications and engineering tool sets. A communications architecture for the PMS 120 may be using fully redundant time-division multiplexing-based networks connecting all power stations.

In some embodiments, a load monitoring system 310 may perform adaptive measurements for changing operational scenarios for an allowable operational region algorithm. The allowable operational region algorithm may be one or more computational parameters for dynamically determining an area of operation for a generator based on a power capability curve. Because generator capability curves may change during system operation, the allowable operational region may be dynamically adjusted by the PMS depending on any curve parameter relating to the power distribution system 100 (i.e., resistive load or reactive power change) and any fixed operator-entered regulation limits.

In some embodiments, the load monitoring system 310 may include a contingency-based load-shedding system (CLS) 312. The CLS 312 may be a protection algorithm that sheds load to maintain a power balance between prime movers and electric power system loads. The CLS 312 may perform load shedding by reducing a total electrical load in the power stations to less than a calculated available turbine and generator capacity after a contingency occurs (i.e., an emergency shut down of a system). Because of the power system net rotating inertia, the CLS 312 may operate fast enough that loads are shed prior to any significant decay in frequency. In other words, when an event occurs that would cause a contingency situation, the CLS 312 may determine a number of loads to shed based on any contingency statuses and metering, user-defined load-shedding priorities, user-defined incremental reserve margin values, topology statuses, and load statuses and metering.

The overall reliability of the load- and generation-shedding systems is improved with redundant controllers using different algorithms. These different algorithms are the underfrequency load-shedding (UFLS) and overfrequency generation-shedding (OFGS) 314. The UFLS and OFGS 314 may be algorithms designed to be a load-shedding protection system secondary to the CLS 312. Because the UFLS requires frequency to decrease, underfrequency triggers may happen later than a CLS 312 contingency trigger. As such, in some embodiments, the CLS 312 scheme minimizes process, frequency, and power disturbances such that UFLS events may therefore be associated with power swings and processing disturbances.

In some embodiments, the PMS 120 may include a generation control system (GCS) 320 that operates over a span of seconds or minutes to slowly correct the system frequency, voltage, active and reactive power flows, power factor, and more. The GCS 320 may control the active and the reactive power flow from generators. The GCS 320 may also participate in system synchronization efforts. In one or more embodiments, the GCS 320 may include an automatic generation control (AGC) 322, a voltage control system (VCS) 326, and an alternative island control system (ICS) 324. Such control systems may be connected to generator unit controllers of the power stations using an interface device that sends and receives control and status signals through one of the established control links 225A and 225B.

The AGC 322 may set points for each generator controlled by the PMS 120 such that an optimal load may be determined for a load-sharing controller. The optimal load-sharing controller receives bias commands from either the frequency or tie flow controller algorithms in the PMS 120. In some embodiments, the ICS 324 may dynamically create individual AGC 322 and VCS 326 control loops for an island grid, thereby allowing the PMS 120 to adapt to all electrical grid conditions as required by any one of the power stations 110A-110C. In some embodiments, the VCS 326 controls a voltage value in any given portion of the power distribution system 100 in coordination with one or more electronic components in the PMS 120.

In one or more embodiments, the sensing system 330 may include various peripherals and instruments used by the PMS 120 to identify external parameters surrounding the power distribution system 100. In some embodiments, the sensing system 330 may include I/O modules 332, at least one front-end processor 334, and meters and relays 336. These devices may be incorporated into instrumentation devices and controlling systems disposed in other portions of the PMS 120.

In one or more embodiments, the power distribution system 340 may include devices for rebalancing the power in the power distribution system 100. In some embodiments, the power distribution system 340 may include a generation-shedding system (GSS) 342 and a synchronization system 344. In some embodiments, the GSS 342 keeps a steady-state frequency of the power system at nominal during a major loss of load. By keeping the frequency at nominal, turbines revolutions per minute (rpm) may be also stabilized, thus keeping turbine generators online and preventing system power outages (i.e., blackouts). In some embodiments, the synchronization system 344 may minimize disturbances created by load shedding.

In some embodiments, the GSS 342 is a fast, contingency-based algorithm that sheds and runs back generators to maintain a power balance between loads and generation. Because of the power system net rotating inertia, the GSS 342 operates fast enough that generation sheds prior to any significant overshoot in frequency. In some embodiments, a GSS contingency is any event that results in excess generation on an island grid. Similar to CLS 312, the GSS 342 may operate by making generation-shedding and/or runback decisions based on three basic categories of information: contingency statuses and metering, topology statuses, and generator statuses and metering.

In some embodiments, when a GSS 342 controller detects a contingency breaker open condition, it determines the generation to shed or run back based on the contingency status and metering, user-defined generator-shedding and runback priorities, user-defined decremental reserve margin (DRM) values, topology statuses, and generator statuses and metering.

In some embodiments, the synchronization system 344 may be used to synchronize individual generators to power grids. These systems may be required to function automatically with minimal human supervision because they must dispatch multiple generators simultaneously to reduce slip and voltage differences at any one of the interconnection points. In some embodiments, the synchronization system 344 may replace analog synchroscopes and manual breaker closings. In some embodiments, the synchronization system 344 measures the voltage and frequency on both sides of several breakers (bus couplers, bus ties, and tie line breakers) to send proportional correction pulses for adjusting electronic parameters as necessary to automatically close a breaker. Advantageously, this process enables safe, secure, unattended synchronization of the generators connected to one bus and the generators on the opposing bus. In the event of a PMS being a hot standby PMS, the synchronization system 344 may perform coupling operations to take over operations controls previously performed by a primary PMS.

Those skilled in the art will appreciate that FIG. 3 is an illustrative example of a PMS in accordance with embodiments disclosed herein, and that components shown may be omitted, duplicated, or combined without departing from the scope herein. For example, while one load monitoring system is shown in FIG. 3, there may be any number of suitable load controls associated with each PMS in the distribution system.

Figure 4:
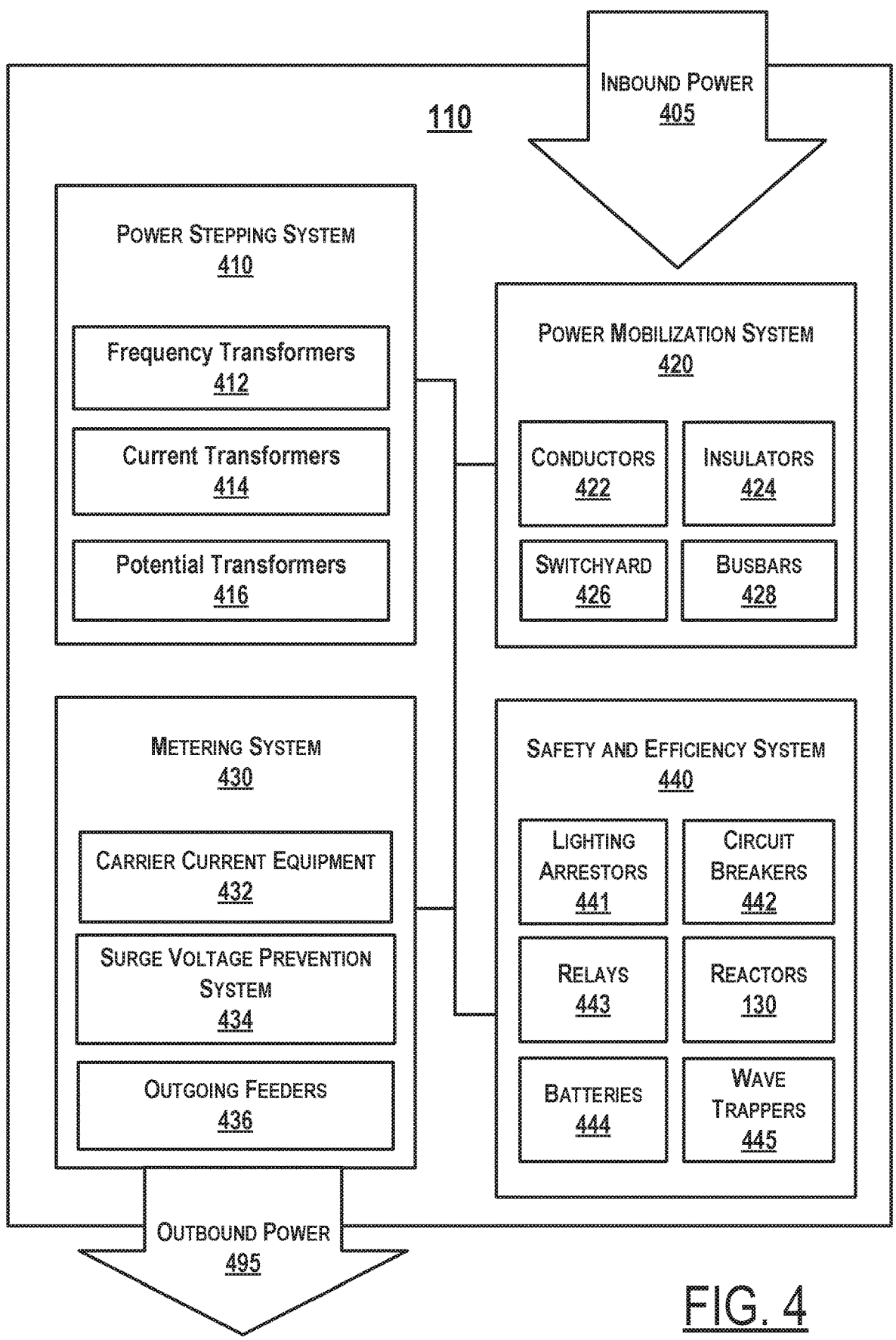
FIG. 4 shows a schematic diagram of a power station in accordance with one or more embodiments.

FIG. 4 shows a power station 110 that controls transmission, production and/or distribution of power toward one or more electronic components of the power distribution system 100. In some embodiments, the power station 110 receives inbound power 405 from another power station or another power distribution system outside of the power distribution system 100. In some embodiments, the power station 110 may transmit outbound power 495 to another power station or a power distribution system outside of the power distribution system 100. Further, in some embodiments, the power station 110 may be any of the power stations 110A-110C described in reference to FIG. 1. This power station 110 may include a power stepping system 410, a power mobilization system 420, a metering system 430, and a safety and efficiency system 440. In some embodiments, the power station 110 may be an electrical substation or a power plant. The PMS 120 may monitor and control all operations of the power station 110 using one or more electronic components described in reference to FIG. 3.

In some embodiments, the power stepping system 410 may include frequency transformers 412, current transformers 414, and a potential transformer 416. In some embodiments, the instrument transformers 412 are static devices utilized for reduction of higher currents and voltages. In some embodiments, the current transformers 414 are devices utilized for the transformation of higher value currents into lower values. The current transformers 414 may be utilized in an analogous manner to that of AC instruments, control apparatus, and meters. In some embodiments, potential transformers 416 may be utilized for converting high voltages to lower voltages for protection of relay system and for lower rating metering of voltage measurements.

In some embodiments, the power mobilization system 420 may include conductors 422, insulators 424, a switchyard 426, and busbars 428. In some embodiments, the conductors 422 are materials which permit flow of electrons through it. In power station 110, these materials may be copper and aluminum bars. The conductors 422 may be utilized for transmission of energy from place to place over various power stations. In some embodiments, insulators 424 are the materials which do not permit flow of electrons throughout. In some embodiments, the switchyard 426 may be a combination of devices and infrastructure configured for distributing electric power in a closed area. In some embodiments, busbars 428 may be is a kind of electrical junction which has outgoing and incoming current paths. If a fault occurs in the busbars 428, entire components connected to that specific section may be tripped for giving thorough isolation in a small time.

In some embodiments, the metering system 430 may include carrier current equipment 432, a surge voltage prevention system 434, and outgoing feeders 436. In some embodiments, the carrier current equipment 432 may be installed in the power station 110 for the purpose of communication, supervisory control, telemetry, and/or relaying. Such equipment may be mounted on a room which is known as carrier room and is connected across power circuit handling high voltages. In some embodiments, the surge voltage prevention system 434 may be hardware and/or software configured to prevent voltage surges. There are several reasons for overvoltage which may be caused due to a sudden alteration in conditions of the system (e.g., load rejection, faults, or switching operations) or because of natural reasons (e.g., lighting). In some embodiments, the outgoing feeders 436 may connections to a bus of the power station 110 for carrying power from the power station 110 to service points or dissipaters.

In some embodiments, the safety and efficiency system 440 may include lighting arrestors 441, circuit breakers 442, relays 443, reactors 130, batteries 444, and wave trappers 445. In some embodiments, the lighting arrestors 441 may be protecting equipment to protect the power station 110 from high voltages while limiting the amplitude and duration of a current's flow. In some embodiments, the circuit breakers 442 may be switches utilized for closing or opening circuits at the time when a fault occurs within the system. In some embodiments, the relays 443 may be a dedicated component of electrical substation equipment for the protection of system against abnormal situations (e.g., faults). Relays 443 may be sensing devices which are devoted for sensing faults and are determining its location as well as sending interruption message of tripped command to the specific point of the circuit. In some embodiments, the reactors 130 may be defined as a set of numerous identical capacitors which are connected either in parallel or series inside an enclosure and are utilized for the correction of power factor as well as protection of circuitry of the power station. These may act as the source of reactive power and are thus reducing phase difference amid current and voltage. The reactors 130 may increase a capacity of ripple current in a power supply. In some embodiments, the batteries 444 may be energy storage units. In some embodiments, the wave trappers 445 may be devices for trapping of high-frequency waves or reflections. The high-frequency waves coming from other power stations or other localities may disturb the current and voltages. As such, the wave trapper may be basically tripping high-frequency waves and is then diverting the waves into telecom panel.

Those skilled in the art will appreciate that FIG. 4 is an illustrative example of a power station in accordance with embodiments disclosed herein, and that components shown may be omitted, duplicated, or combined without departing from the scope herein.

Figure 5:
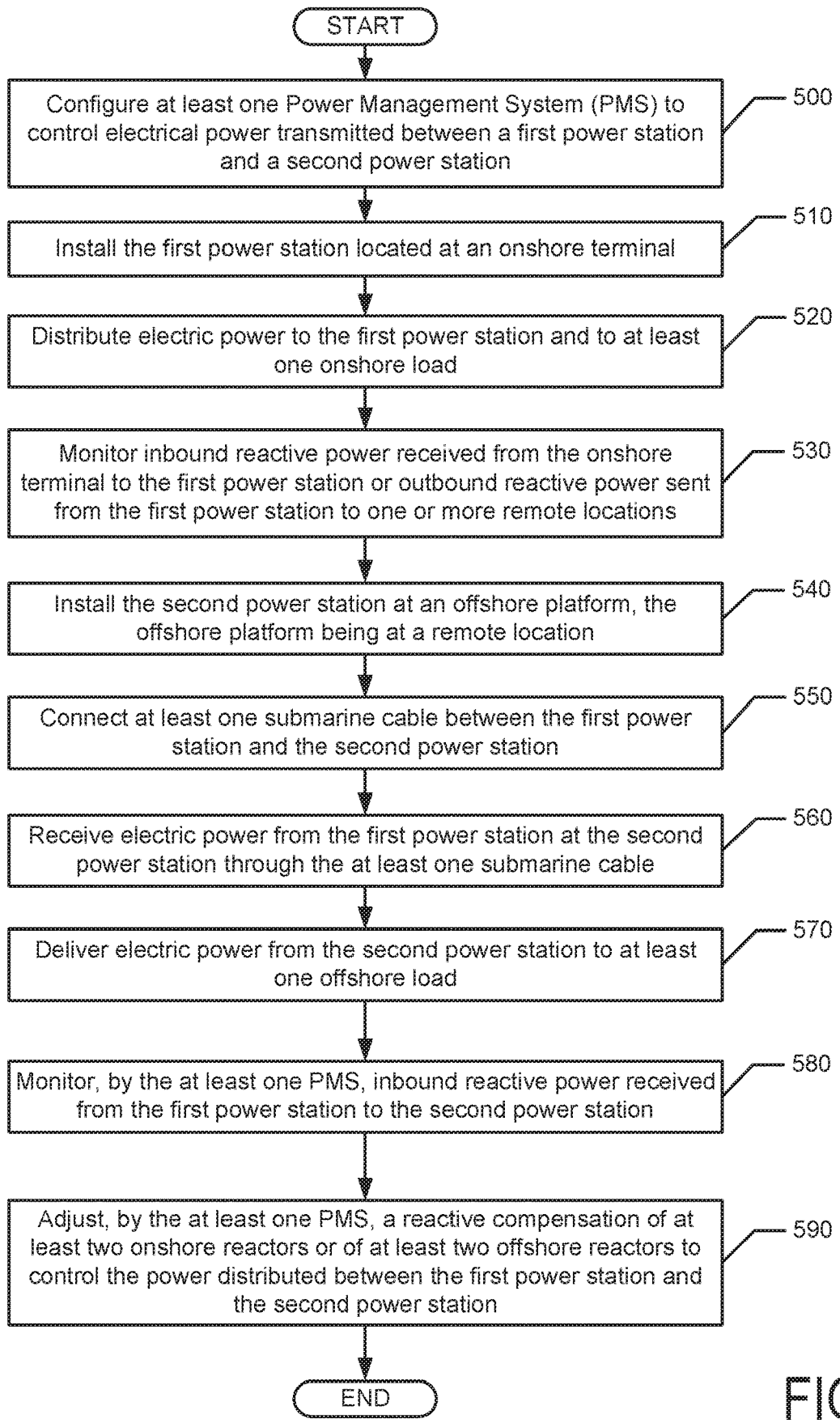
FIG. 5 shows a flowchart in accordance with one or more embodiments.

FIG. 5 shows a flowchart in accordance with one or more embodiments. Specifically, FIG. 5 describes a method for distributing electrical power to a remote location from an onshore platform 110 as described in reference to FIGS. 1-4. Further, one or more blocks in FIG. 5 may be performed by one or more components as described in FIG. 6 (e.g., computing system 600 including computer processor(s) 604 and communication interface 608). While the various blocks in FIG. 5 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 500, the PMS 120 may be configured to control electrical reactive power transmitted between a first power station 110A and a second power station 110C. The PMS 120 may be configured into the power distribution system 100 to control every reactive power transmission between the two power stations.

In Block 510, the first power station 110A is installed at an onshore terminal 125. The installation may be performed using various construction procedures. Along with the first power station 110A, power station equipment such as the equipment described in reference to FIG. 4 may be installed. In some embodiments, the onshore terminal 125 may be a piece of land or an island capable of sustaining electrical components and electronic equipment associated to the power station 110A.

In Block 520, electric power is distributed to the first power station 110A and to at least one onshore load 115A. Electric power is distributed to various locations in the onshore platform 125. In some embodiments, the onshore load 105A may be regulated using one or more procedures as described in reference to the PMSs 120A and 120B.

In Block 530, inbound reactive power 405 received from the onshore terminal 125 to the first power station 110A is monitored. Alternatively, in one or more embodiments, outbound reactive power 495 sent from the first power station 110A to one or more remote locations is monitored. In both scenarios, the PMS 120A or the PMS 120B determine monitoring parameters for the inbound reactive power 405 or the outbound reactive power 495 based on predetermined parameters.

In Block 540, the second power station 110C is installed at an offshore platform 145, the offshore platform 145 being at a location remote from the onshore platform. The offshore platform 145 may be an offshore deck including a main deck and mid deck disposed on raisers 180, as shown in FIG. 1.

In Block 550, at least one submarine cable 150A is connected between the first power station and the second power station. The submarine cable 150A may be the same as submarine cables 150B and 150C. As such, the submarine cable 150A may be extended for a first distance 190A or over a combination of distances 190B and 190C.

In Block 560, electric power is received from the first power station 110A at the second power station 110C through the at least one submarine cable 150A. The connection may be established without using intermediate connections or transformers along the distances such that only the power stations 110A and 110C are located at each end of the submarine cable 150.

In Block 570, electric power is delivered from the second power station 150B to at least one offshore load 105C. Similar to the electrical distribution power delivered to the onshore load 105A, the offshore load 105C may be regulated using one or more procedures as described in reference to the PMSs 120A and 120B.

In Block 580, the PMS 120 monitors inbound reactive power 405 received from the first power station 110A by the second power station 110C.

In Block 590, the at least one PMS 120 adjusts a reactive compensation of any variable reactors located in the first power station 110A or the second power station 110C to control electric power distributed between the first power station 110A and the second power station 110C.

In one or more embodiments, the PMS 120A and the PMS 120B may be two redundant power management controllers that control all electronic equipment and electronic components at the first power station 110A and the second power station 110C. In some embodiments, the PMS 120A and the PMS 120B are redundant and communicating constantly such that one PMS takes full control for all electronic equipment and devices and another PMS is a hot standby for the primary PMS. The PMSs may be programed to dynamically maintain voltage and power factor within acceptable limit in loading scenarios for the power stations 110A and 110C to eliminate shutdown due to overvoltage caused by changing loading conditions.

The PMS 120 is used for controlling the variable reactors 130AA-130AD, 130CA, and 130CB in island mode (i.e., in which the PMS 120 controls a small power grid) between two power stations 110A and 110C that are interconnected radially through long submarine cables 150A and 150C. For radially connected power stations 110A and 110C, voltage may be regulated on both sides of the submarine cables 150A and 150C for preventing excess of a maximum continuous voltage level in the submarine cables 150A and 150C at any point within the distance. In this regard, the PMS 120 acts as a centralized MVAR controller to mitigate any negative MVARs generated by the submarine cables 150A and 150C.

One or more embodiments disclosed herein is directed toward a power supply to Onshore facility that feeds an offshore facility through one or more long submarine cables generating approximately negative 400MVARs which requires control through variable shunt reactors. More specifically, the variable shunt reactors are controlled by one or more Power Management System (PMSs), which in some existing facilities was used to control the generators. For radially connected power substations, as shown in FIG. 1, the PMSs regulate the voltage on both sides as well as prevent exceeding the maximum continuous voltage level of the submarine cable at any point within the 90 km length of the cable, as 230 kV submarine cables produce a lot of negative MVARs which needs to be absorbed by positive MVARs to stabilize the voltage.

Embodiments disclosed herein may be implemented using virtually any type of computing system, regardless of the platform being used. In some embodiments, one or more modules of the PMS 120 may be computer systems located at a remote location such that controlling and monitoring of electric power is processed away from the power stations 110A-110C. In some embodiments, the PMSs 120A and 120B may be fully implemented in a computer system. In some embodiments, the computing system may be implemented on remote or handheld devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

Figure 6:
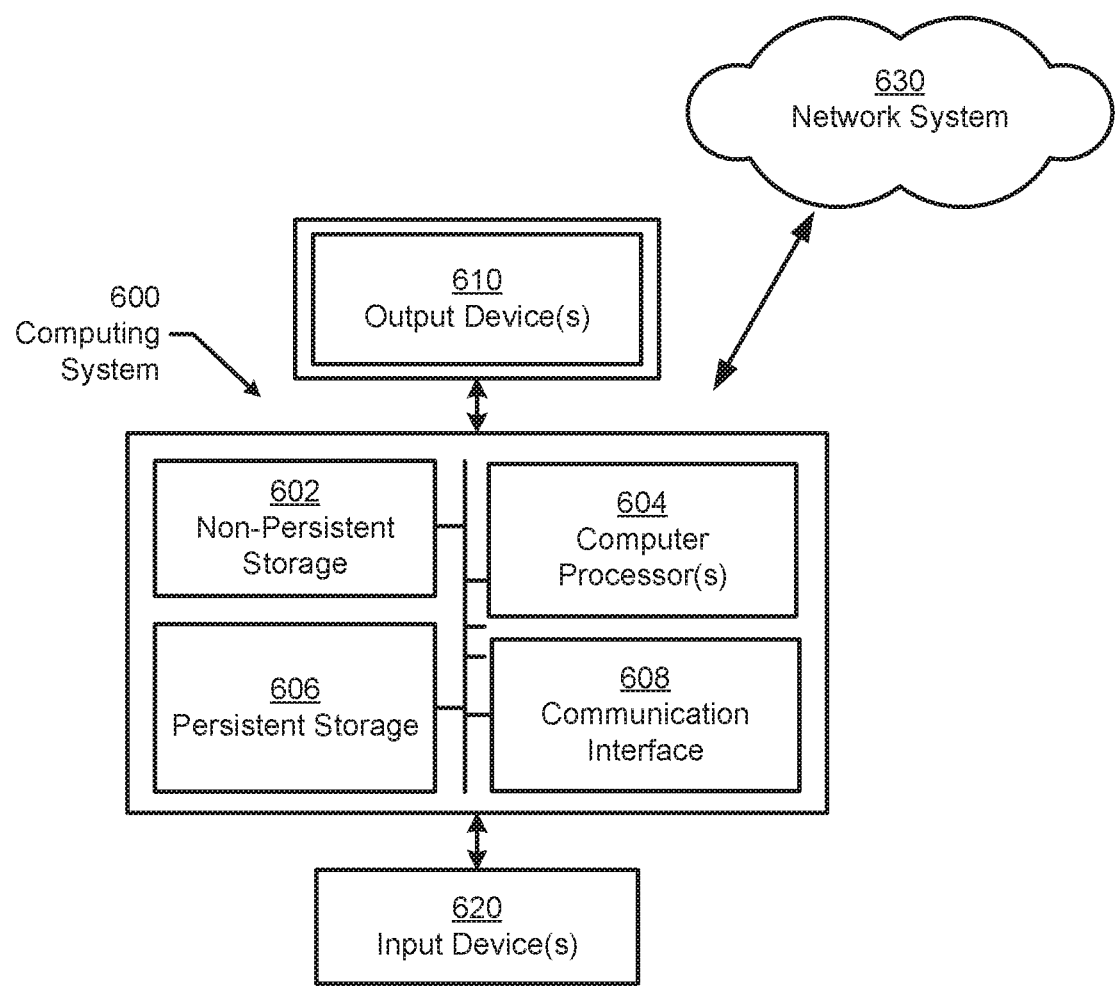
FIG. 6 shows a computer system in accordance with one or more embodiments.

As shown in FIG. 6, the computing system 600 may include one or more computer processor(s) 604, non-persistent storage 602 (e.g., random access memory (RAM), cache memory, or flash memory), one or more persistent storage 606 (e.g., a hard disk), and numerous other elements and functionalities. The computer processor(s) 604 may be an integrated circuit for processing instructions. The computing system 600 may also include one or more input device(s) 620, such as a touchscreen, keyboard, mouse, microphone, touchpad, electronic pen, or any other type of input device. Further, the computing system 600 may include one or more output device(s) 610, such as a screen (e.g., a liquid crystal display (LCD), a plasma display, or touchscreen), a printer, external storage, or any other output device. One or more of the output device(s) may be the same or different from the input device(s). The computing system 600 may be connected to a network system 730 (e.g., a local area network (LAN), a wide area network (WAN) such as the Internet, mobile network, or any other type of network) via a network interface connection (not shown).

Further, one or more elements of the aforementioned computing system 600 may be located at a remote location and be connected to the other elements over the network system 630 across the power stations 110A-110C. The network system 630 may be a cloud-based interface performing processing at a remote location from the well site and connected to the other elements over a network. In this case, the computing system 600 may be connected through a remote connection established using a 5G connection, such as a protocols established in Release 15 and subsequent releases of the 3GPP/New Radio (NR) standards.

The computing system in FIG. 6 may implement and/or be connected to a data repository. For example, one type of data repository is a database. A database is a collection of information configured for ease of data retrieval, modification, re-organization, and deletion.

While FIGS. 1-5 show various configurations of components, other configurations may be used without departing from the scope of the disclosure. For example, various components in FIG. 5 may be combined to create a single component. As another example, the functionality performed by a single component may be performed by two or more components.

While the disclosure has been described with respect to a limited number of embodiments, those skilled in the art, having benefit of this disclosure, will appreciate that other embodiments can be devised which do not depart from the scope of the disclosure as disclosed herein. Accordingly, the scope of the disclosure should be limited only by the attached claims.

What is claimed is:

1. A distribution system, the system comprising:
   at least one Power Management System (PMS) that controls electrical power transmitted by the distribution system;
   a first power station located at an onshore platform, comprising:
      an onshore terminal that distributes electric power to the first power station and to at least one onshore load, and
      a plurality of onshore reactors that monitor inbound reactive power received from the onshore terminal or that monitor outbound reactive power sent to a remote location;
   a second power station located at an offshore platform which is located at the remote location, the second power station comprising:
      an offshore terminal that receives electric power from the first power station and that delivers electric power to at least one offshore load, and
      a plurality of offshore reactors that monitor inbound reactive power received from the first power station; and
   at least one submarine cable connected between the first power station and the second power station,
   wherein the at least one PMS monitors compensation reactive power in the plurality of onshore reactors and the plurality of offshore reactors.

2. The system of claim 1, wherein the first power station comprises four onshore reactors and the second power station comprises two offshore reactors.

3. The system of claim 2, wherein the system further comprises a first PMS located at the first power station and a second PMS located at the second power station.

4. The system of claim 3,
   wherein the first PMS located at the first power station controls the four onshore reactors and the two offshore reactors, and
   wherein the second PMS located at the second power station is a hot standby for the first PMS.

5. The system of claim 1, wherein the system further comprises two submarine cables connected between the first power station and the second power station.

6. The system of claim 1, wherein the at least one PMS monitors an electrical parameter representative of a performance of the at least one submarine cable and adjusts a reactive compensation of the at least two onshore reactors or the at least two offshore reactors to control the power distributed between the first power station and the second power station.

7. The system of claim 6, wherein the electrical parameter is a frequency of transmission of the power or a voltage of transmission of the power.

8. The system of claim 1, wherein the at least one PMS dynamically adjusts compensation reactive power in the plurality of onshore reactors and in the plurality of offshore reactors to maintain a total reactive power of the distribution system at or below a predetermined threshold.

9. A method for distributing electrical power to a remote location from an onshore platform, the method comprising:
   configuring at least one Power Management System (PMS) to control electrical power transmitted between a first power station and a second power station;
   installing the first power station located at an onshore terminal;
   distributing electric power to the first power station and to at least one onshore load;
   monitoring, by the at least one PMS, inbound reactive power received from the onshore terminal to the first power station or outbound reactive power sent from the first power station to one or more remote locations;
   installing the second power station at an offshore platform, the offshore platform being located at a remote location;
   connecting at least one submarine cable between the first power station and the second power station;
   receiving electric power from the first power station at the second power station through the at least one submarine cable;
   delivering electric power from the second power station to at least one offshore load; and monitoring, by the at least one PMS, inbound reactive power received from the first power station at the second power station, wherein the first power station comprises four onshore reactors and the second power station comprises two offshore reactors.

10. The method of claim 9, further comprising:

dynamically adjusting, by the at least one PMS, compensation reactive power in the four onshore reactors and the two offshore reactors to maintain a total reactive power of the distribution system at or below a predetermined threshold.

11. The method of claim 9, further comprising:

configuring two PMSs to control the electrical power distributed between the two power stations, a first PMS being located at the first power station and a second PMS being located at the second power station.

12. The method of claim 11, further comprising:

controlling, by the first PMS located at the first power station, the four onshore reactors and the two offshore reactors, and performing, by the second PMS located at the second power station, a hot standby function for the first PMS upon disconnection of the first PMS.

13. The method of claim 9, further comprising:

connecting two submarine cables between the first power station and the second power station.

14. The method of claim 10, further comprising:

monitoring, by the at least one PMS, an electrical parameter representative of a performance of the at least one submarine cable; and adjusting, by the at least one PMS, a reactive compensation of at least two onshore reactors or of at least two offshore reactors to control the power distributed between the first power station and the second power station connecting two submarine cables between the first power station and the second power station.

15. The method of claim 14, wherein the electrical parameter is a frequency of transmission of the power or a voltage of transmission of the power.

16. A non-transitory computer readable medium storing instructions executable by a computer processor, the instructions comprising functionality for:

configuring at least one Power Management System (PMS) to control electrical power transmitted between a first power station and a second power station;

distributing electric power to a first power station and to at least one onshore load located at an onshore platform;

monitoring, by the at least one PMS, inbound reactive power received from an onshore terminal to the first power station or outbound reactive power sent from the first power station to one or more remote locations;

monitoring, by the at least one PMS, electric power received from the first power station at a second power station through at least one submarine cable that connects the first power station and the second power station;

distributing electric power from the second power station to at least one offshore load; and monitoring, by the at least one PMS, inbound reactive power received from the first power station at the second power station.

17. The non-transitory computer readable medium of claim 16, wherein the first power station comprises four onshore reactors and the second power station comprises two offshore reactors.

18. The non-transitory computer readable medium of claim 17, the instructions further comprising functionality for:

configuring two PMSs to control the electrical power distributed between the two power stations, a first PMS being located at the first power station and a second PMS being located at the second power station.

19. The non-transitory computer readable medium of claim 17, the instructions further comprising functionality for:

controlling, by the first PMS located at the first power station, the four onshore reactors and the two offshore reactors, and performing, by the second PMS located at the second power station, a hot standby function for the first PMS upon disconnection of the first PMS.

\* \* \* \* \*